US012625107B2

(12) United States Patent
    Kondo

(10) Patent No.: US 12,625,107 B2
(45) Date of Patent: May 12, 2026

(54) CO₂ MASS ESTIMATION SYSTEM, EXHAUST GAS COMPOSITION RATIO ESTIMATION METHOD, AND CO₂ MASS ESTIMATION METHOD

(71) Applicant: NGK INSULATORS, LTD., Nagoya (JP)

(72) Inventor: Yuichiro Kondo, Obu (JP)

(73) Assignee: NGK INSULATORS, LTD., Nagoya (JP)

( * ) Notice: Subject to any disclaimer, the term of this patent is extended or adjusted under 35 U.S.C. 154(b) by 374 days.

(21) Appl. No.: 18/185,593

(22) Filed: Mar. 17, 2023

(65) Prior Publication Data

US 2023/0349855 A1    Nov. 2, 2023

(30) Foreign Application Priority Data

Mar. 31, 2022    (JP) ................................ 2022-058417

(51) Int. Cl.
    *G01N 27/416*        (2006.01)
    *G01N 27/406*        (2006.01)
            (Continued)
(52) U.S. Cl.
    CPC ..... *G01N 27/4162* (2013.01); *G01N 27/4065* (2013.01); *G01N 27/4073* (2013.01);
            (Continued)
(58) Field of Classification Search
    CPC ........... G01N 27/4162; G01N 27/4073; G01N 27/409; G01N 27/419; G01N 27/416;
            (Continued)

(56) References Cited

U.S. PATENT DOCUMENTS

2011/0132342 A1*   6/2011   Soltis .................. F02D 41/0025
                                                            123/703
2015/0034484 A1    2/2015   Nakasone et al.
2016/0223487 A1    8/2016   Okamoto et al.

FOREIGN PATENT DOCUMENTS

JP          5918177 B2      5/2016
JP          6469464 B2      2/2019

* cited by examiner

*Primary Examiner* — James Lin
*Assistant Examiner* — Vivian A Tran
(74) *Attorney, Agent, or Firm* — Mattingly & Malur, PC

(57)            ABSTRACT

A CO₂ mass estimation system includes: an acquisition element acquiring detected values in accordance with concentrations of oxygen, H₂O, and CO₂ contained in an engine exhaust gas output from a gas sensor; a setting element setting an air-fuel ratio of a mixture; and a calculation element calculating the mass of CO₂ contained in the exhaust gas, wherein the calculation element calculates the concentrations of oxygen, H₂O, and CO₂ contained in the exhaust gas based on the sensor detected values, acquires concentrations of oxygen and H₂O in air and the air-fuel ratio, calculates a composition ratio of at least C atoms contained in fuel based on the concentrations in the exhaust gas, the concentrations in the air, and the air-fuel ratio, and estimates the mass of CO₂ contained in the exhaust gas based on the composition ratio and the amount of injection of the fuel into the engine.

2 Claims, 3 Drawing Sheets

(51) Int. Cl.

| | |
|---|---|
| *G01N 27/407* | (2006.01) |
| *G01N 27/409* | (2006.01) |
| *G01N 27/41* | (2006.01) |
| *G01N 27/417* | (2006.01) |
| *G01N 27/419* | (2006.01) |

(52) U.S. Cl.
CPC ....... *G01N 27/4074* (2013.01); *G01N 27/409* (2013.01); *G01N 27/41* (2013.01); *G01N 27/417* (2013.01); *G01N 27/419* (2013.01)

(58) Field of Classification Search
CPC ..... G01N 27/417; G01N 27/407–4071; G01N 27/4074; G01N 27/4065; G01N 27/41
See application file for complete search history.

F I G. 2
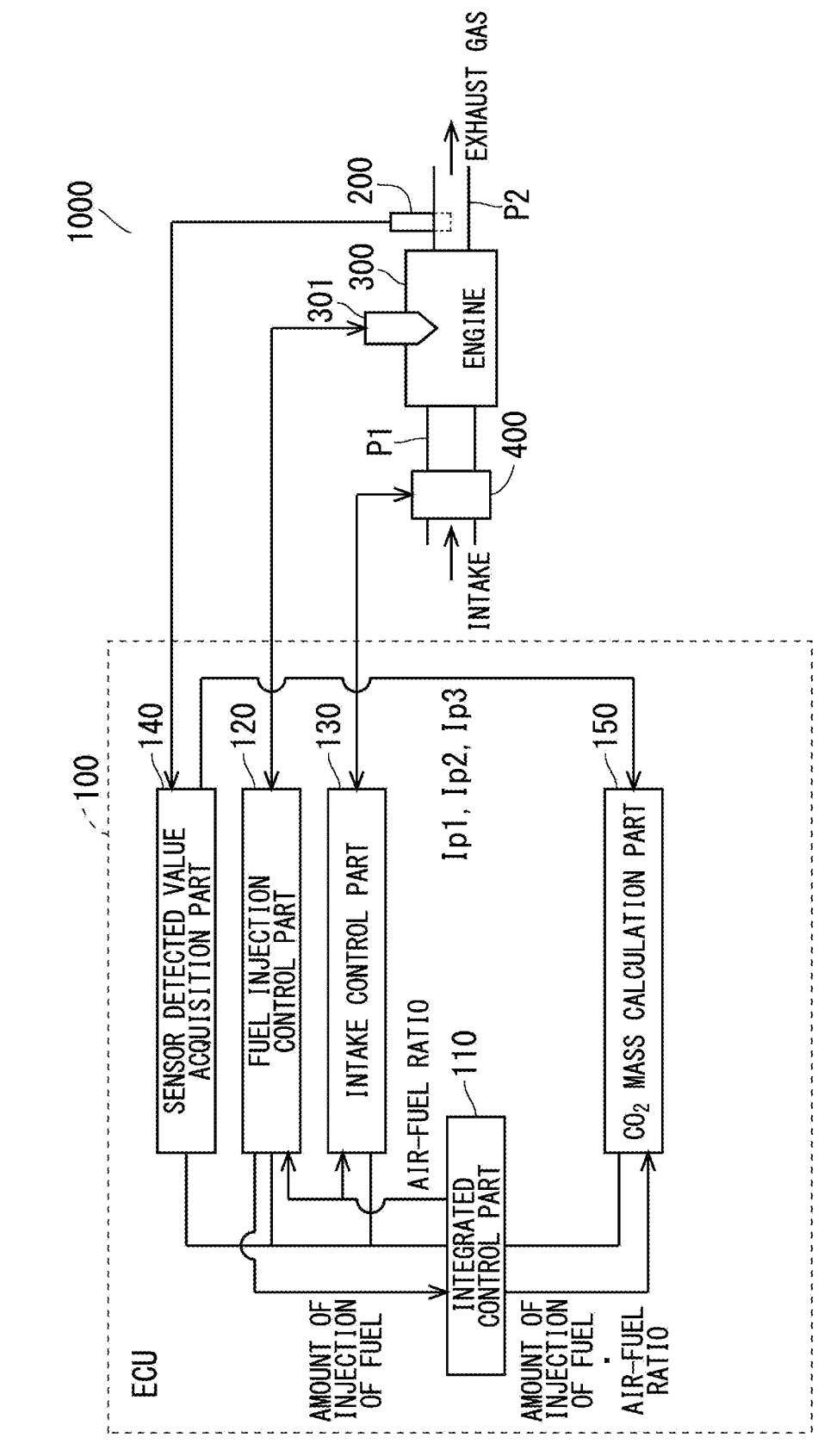

F I G. 3
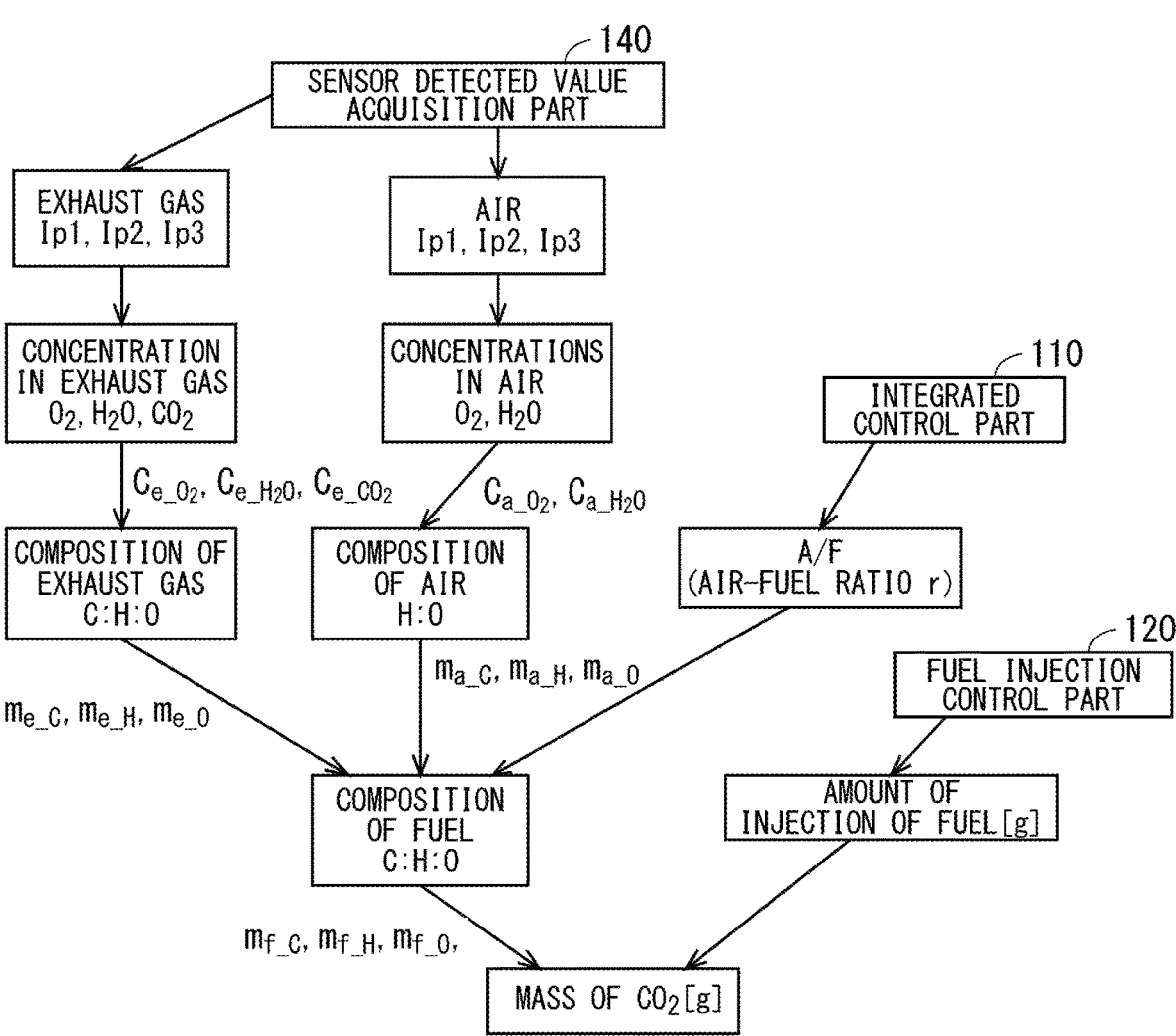

$CO_2$ MASS ESTIMATION SYSTEM, EXHAUST GAS COMPOSITION RATIO ESTIMATION METHOD, AND $CO_2$ MASS ESTIMATION METHOD

CROSS-REFERENCE TO RELATED APPLICATION

The present application claims priority from Japanese application JP2022-058417, filed on Mar. 31, 2022, the contents of which is hereby incorporated by reference into this application.

BACKGROUND OF THE INVENTION

Field of the Invention

The present invention relates to estimation of the mass of $CO_2$ contained in an exhaust gas from an engine of a vehicle.

Description of the Background Art

In measurement for managing the amount of an emitted exhaust gas from a vehicle, technology of measuring a concentration of carbon dioxide ($CO_2$) has already been known (see Japanese Patent No. 5918177 and Japanese Patent No. 6469464, for example). In each of gas sensors disclosed in Japanese Patent No. 5918177 and Japanese Patent No. 6469464, in addition to a carbon dioxide ($CO_2$) component, a water vapor ($H_2O$) component can be measured in parallel.

In management of the amount of the emitted exhaust gas of the vehicle, measurement of the mass of emission is more important than measurement of a concentration of emission in some cases (an example of a reference amount of emission: 95 g $CO_2$/km or less). Japanese Patent No. 5918177 and Japanese Patent No. 6469464 disclose a method of measuring the concentration of $CO_2$, but fail to disclose a method of measuring the mass of $CO_2$. The mass can be calculated based on the concentration, but it requires measurement of mass flow of the exhaust gas. This is because there is a relationship expressed by an equation concentration of $CO_2$×mass flow=mass of $CO_2$.

However, measurement of mass flow of the exhaust gas during travel of the vehicle is not necessarily easy, and addition of a component for measurement is not practical in terms of cost and the like. It is rather preferable to estimate the mass of emission of $CO_2$ using existing components and information.

SUMMARY

The present invention is directed to estimation of the mass of $CO_2$ contained in an exhaust gas from an engine of a vehicle.

According to the present invention, a system for estimating the mass of $CO_2$ contained in an exhaust gas from an engine of a vehicle includes: a gas sensor capable of outputting detected values in accordance with concentrations of oxygen, $H_2O$, and $CO_2$ contained in a measurement gas; a detected value acquisition element acquiring detected values in accordance with concentrations of oxygen, $H_2O$, and $CO_2$ contained in the exhaust gas from the engine, the detected values being output from the gas sensor; an air-fuel ratio setting element setting an air-fuel ratio of a mixture of fuel and air supplied to the engine; and a calculation element calculating the mass of $CO_2$ contained in the exhaust gas, wherein the calculation element calculates the concentrations of oxygen, $H_2O$, and $CO_2$ contained in the exhaust gas based on the detected values output from the gas sensor when the measurement gas is the exhaust gas, acquires concentrations of oxygen and $H_2O$ in air, acquires the air-fuel ratio set by the air-fuel ratio setting element, calculates a composition ratio of at least C atoms contained in the fuel based on the concentrations of oxygen, $H_2O$, and $CO_2$ contained in the exhaust gas, the concentrations of oxygen and $H_2O$ in the air, and the air-fuel ratio acquired from the air-fuel ratio setting element, and estimates the mass of $CO_2$ contained in the exhaust gas based on the calculated composition ratio and the amount of injection of the fuel into the engine.

According to the present invention, the mass of $CO_2$ contained in the exhaust gas when a certain mass of fuel is injected can be estimated without measuring mass flow of the exhaust gas.

It is thus an object of the present invention to provide a method of estimating the mass of emission of $CO_2$ contained in an exhaust gas without measuring mass flow.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 schematically shows a configuration of a $CO_2$ mass estimation system 1000; and FIG. 3 schematically shows a relationship among various parameters used for estimation of the mass of $CO_2$.

DESCRIPTION OF THE PREFERRED EMBODIMENTS

<Configuration of Gas Sensor>

Figure 1:
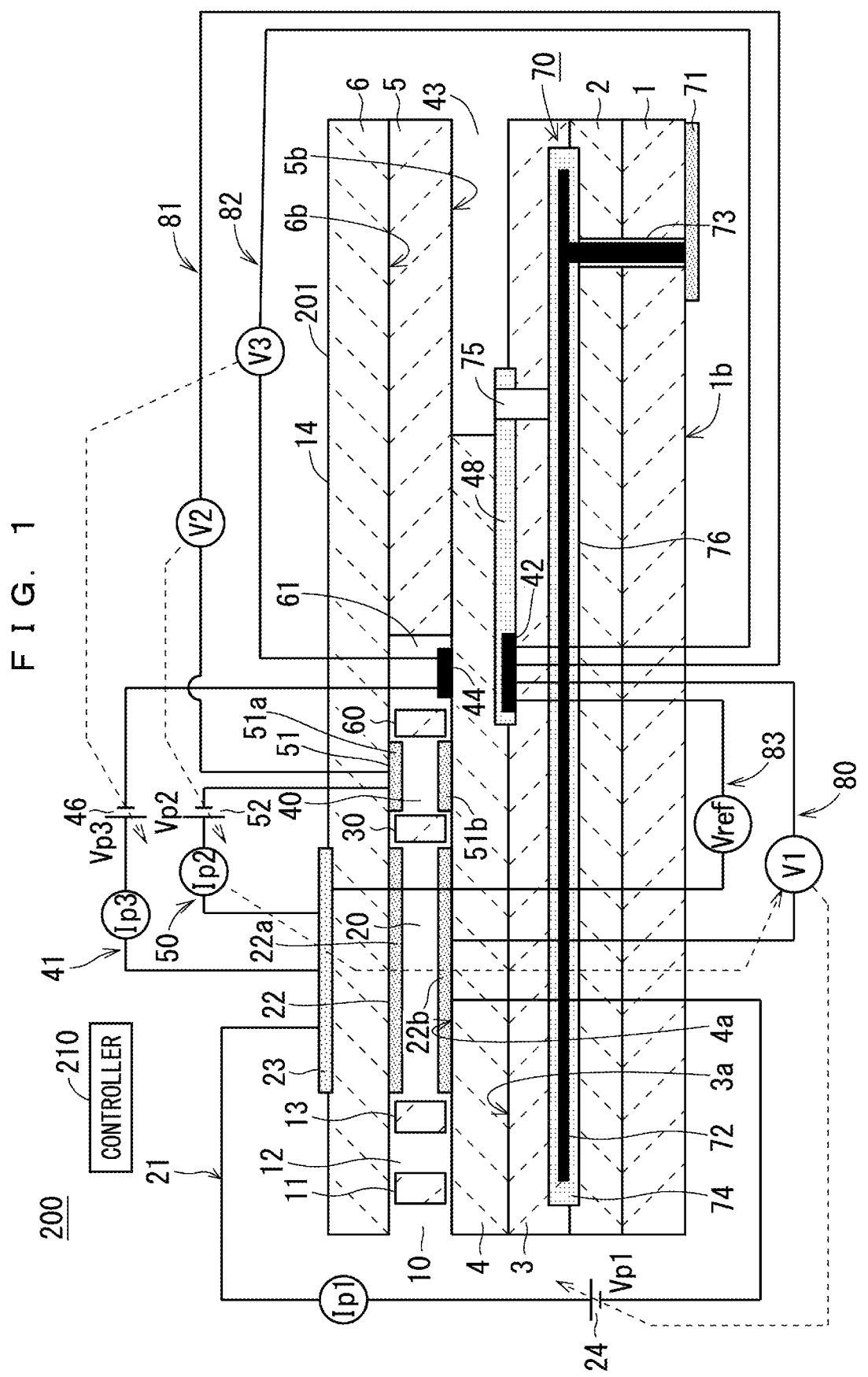
FIG. 1 schematically shows one example of a configuration of a gas sensor 200.

FIG. 1 schematically shows one example of a configuration of a gas sensor 200 of a $CO_2$ mass estimation system 1000 (FIG. 2) according to the present embodiment. The gas sensor 200 is a multi-gas sensor sensing a plurality of types of gas components and measuring concentrations thereof using a sensor element 201. Assume that at least water vapor ($H_2O$) and carbon dioxide ($CO_2$) are main sensing target gas components of the gas sensor 200 in the present embodiment. The gas sensor 200 further includes a controller 210 controlling operation of each part. As will be described below, the gas sensor 200 is attached to an exhaust path of an engine of a vehicle, and is used with an exhaust gas flowing along the exhaust path as a measurement gas in the present embodiment. FIG. 1 includes a vertical cross-sectional view taken along a longitudinal direction of the sensor element 201.

The sensor element 201 includes an elongated planar structure (base part) 14 formed of an oxygen-ion conductive solid electrolyte, a gas inlet 10 which is located in one end portion (a left end portion in FIG. 1) of the structure 14 and through which the measurement gas is introduced, and a buffer space 12, a first chamber 20, a second chamber 40, and a third chamber 61 located in the structure 14 and communicating sequentially from the gas inlet 10. The buffer space 12 communicates with the gas inlet 10 via a first diffusion control part 11. The first chamber 20 communicates with the buffer space 12 via a second diffusion control part 13. The second chamber 40 communicates with the first chamber 20 via a third diffusion control part 30. The third chamber 61 communicates with the second chamber 40 via a fourth diffusion control part 60.

The structure 14 is formed by laminating a plurality of substrates of ceramics, for example. Specifically, the structure 14 has a configuration in which six layers including a first substrate 1, a second substrate 2, a third substrate 3, a first solid electrolyte layer 4, a spacer layer 5, and a second solid electrolyte layer 6 are sequentially laminated from the bottom. Each layer is formed of an oxygen-ion conductive solid electrolyte, such as zirconia ($ZrO_2$).

The gas inlet 10, the first diffusion control part 11, the buffer space 12, the second diffusion control part 13, the first chamber 20, the third diffusion control part 30, the second chamber 40, the fourth diffusion control part 60, and the third chamber 61 are formed in this order between a lower surface 6b of the second solid electrolyte layer 6 and an upper surface 4a of the first solid electrolyte layer 4 on a side of the one end portion of the structure 14. A part extending from the gas inlet 10 to the third chamber 61 is also referred to as a gas distribution part.

The gas inlet 10, the buffer space 12, the first chamber 20, the second chamber 40, and the third chamber 61 are formed to penetrate the spacer layer 5 in a thickness direction. The lower surface 6b of the second solid electrolyte layer 6 is exposed in upper portions in FIG. 1 of these chambers and the like, and the upper surface 4a of the first solid electrolyte layer 4 is exposed in lower portions in FIG. 1 of these chambers and the like. Side portions of these chambers and the like are each defined by the spacer layer 5 or any of the diffusion control parts.

The first diffusion control part 11, the second diffusion control part 13, the third diffusion control part 30, and the fourth diffusion control part 60 each include two horizontally long slits. That is to say, they each have openings elongated in a direction perpendicular to the page of FIG. 1 in an upper portion and a lower portion in FIG. 1 thereof.

The sensor element 201 includes a reference gas introduction space 43 in the other end portion (a right end portion in FIG. 1) opposite the one end portion in which the gas inlet 10 is located. The reference gas introduction space 43 is formed between an upper surface 3a of the third substrate 3 and a lower surface 5b of the spacer layer 5. A side portion of the reference gas introduction space 43 is defined by a side surface of the first solid electrolyte layer 4. Oxygen ($O_2$) and air are introduced into the reference gas introduction space 43 as reference gases, for example.

The gas inlet 10 is a part opening to an external space, and the measurement gas is taken from the external space into the sensor element 201 through the gas inlet 10.

The first diffusion control part 11 is a part providing predetermined diffusion resistance to the measurement gas introduced through the gas inlet 10 into the buffer space 12.

The buffer space 12 is formed to cancel concentration fluctuations of the measurement gas caused by pressure fluctuations of the measurement gas in the external space. Pulsation of exhaust pressure of the exhaust gas of the vehicle is taken as an example of such pressure fluctuations of the measurement gas, for example.

The second diffusion control part 13 is a part providing predetermined diffusion resistance to the measurement gas introduced from the buffer space 12 into the first chamber 20.

The first chamber 20 is formed as a space to pump out oxygen from the measurement gas introduced through the second diffusion control part 13, and, further, to reduce (decompose) $H_2O$ and $CO_2$ contained as the sensing target gas components in the measurement gas to generate hydrogen ($H_2$) and carbon monoxide (CO) so that not only oxygen but also $H_2O$ and $CO_2$ are not substantially contained in the measurement gas. Reduction (decomposition) of $H_2O$ and $CO_2$ is implemented by operation of a first pump cell 21.

The first pump cell 21 is an electrochemical pump cell including a first inner pump electrode 22, an outer pump electrode 23, and a solid electrolyte present in a portion of the structure 14 sandwiched between these electrodes.

In the first pump cell 21, a voltage Vp1 is applied across the first inner pump electrode 22 and the outer pump electrode 23 from a variable power supply 24 disposed outside the sensor element 201 to generate an oxygen pump current (oxygen ion current) Ip1. Oxygen in the first chamber 20 can thereby be pumped out to the external space.

The first inner pump electrode 22 is disposed on substantially the entire portions of the lower surface 6b of the second solid electrolyte layer 6 and the upper surface 4a of the first solid electrolyte layer 4 defining the first chamber 20 respectively as a ceiling electrode 22a and a bottom electrode portion 22b.

The first inner pump electrode 22 is formed, with platinum as a metal component, as a porous cermet electrode including platinum and zirconia and being rectangular in plan view, for example.

The outer pump electrode 23 is formed, with platinum or an alloy (a Pt—Au alloy) of platinum and gold as a metal component, as a porous cermet electrode including platinum or the Pt—Au alloy and zirconia and being rectangular in plan view, for example.

In the sensor element 201, the first inner pump electrode 22, a reference electrode 42, and a solid electrolyte present in a portion of the structure 14 sandwiched between these electrodes constitute a first chamber sensor cell 80. The first chamber sensor cell 80 is an electrochemical sensor cell to grasp oxygen partial pressure in an atmosphere in the first chamber 20.

The reference electrode 42 is an electrode formed between the first solid electrolyte layer 4 and the third substrate 3, and is formed as a porous cermet electrode including platinum and zirconia and being rectangular in plan view, for example.

A reference gas introduction layer 48 formed of porous alumina and leading to the reference gas introduction space 43 is disposed around the reference electrode 42. A reference gas in the reference gas introduction space 43 is introduced into a surface of the reference electrode 42 via the reference gas introduction layer 48. That is to say, the reference electrode 42 is always in contact with the reference gas.

In the first chamber sensor cell 80, electromotive force (Nernst electromotive force) V1 is generated between the first inner pump electrode 22 and the reference electrode 42. The electromotive force V1 has a value in accordance with a difference between an oxygen concentration (oxygen partial pressure) in the first chamber 20 and an oxygen concentration (oxygen partial pressure) of the reference gas. The oxygen concentration (oxygen partial pressure) of the reference gas is basically constant, so that the electromotive force V1 has a value in accordance with the oxygen concentration (oxygen partial pressure) in the first chamber 20.

The third diffusion control part 30 is a part providing predetermined diffusion resistance to the measurement gas introduced from the first chamber 20 into the second chamber 40, containing $H_2$ and CO, and substantially not containing $H_2O$, $CO_2$, and oxygen.

The second chamber 40 is formed as a space to selectively oxidize, from among $H_2$ and CO contained in the measurement gas introduced through the third diffusion control part 30, only all of $H_2$ to generate $H_2O$ again. Generation of $H_2O$ due to oxidation of $H_2$ is implemented by operation of a second pump cell 50.

The second pump cell 50 is an electrochemical pump cell including a second inner pump electrode 51, the outer pump electrode 23, and a solid electrolyte present in a portion of the structure 14 sandwiched between these electrodes.

In the second pump cell 50, a voltage Vp2 is applied across the second inner pump electrode 51 and the outer pump electrode 23 from a variable power supply 52 disposed outside the sensor element 201 to generate an oxygen pump current (oxygen ion current) Ip2. Oxygen can thereby be pumped in from the external space to the second chamber 40.

The second inner pump electrode 51 is disposed on substantially the entire portions of the lower surface 6b of the second solid electrolyte layer 6 and the upper surface 4a of the first solid electrolyte layer 4 defining the second chamber 40 respectively as a ceiling electrode 51a and a bottom electrode portion 51b.

The second inner pump electrode 51 is formed, with the Pt—Au alloy as a metal component, as a porous cermet electrode including the Pt—Au alloy and zirconia and being rectangular in plan view, for example.

In the sensor element 201, the second inner pump electrode 51, the reference electrode 42, and a solid electrolyte present in a portion of the structure 14 sandwiched between these electrodes constitute a second chamber sensor cell 81. The second chamber sensor cell 81 is an electrochemical sensor cell to grasp oxygen partial pressure in an atmosphere in the second chamber 40.

In the second chamber sensor cell 81, electromotive force (Nernst electromotive force) V2 is generated between the second inner pump electrode 51 and the reference electrode 42. The electromotive force V2 has a value in accordance with a difference between an oxygen concentration (oxygen partial pressure) in the second chamber 40 and the oxygen concentration (oxygen partial pressure) of the reference gas. Since the oxygen concentration (oxygen partial pressure) of the reference gas is basically constant, the electromotive force V2 has a value in accordance with the oxygen concentration (oxygen partial pressure) in the second chamber 40.

The fourth diffusion control part 60 is a part providing predetermined diffusion resistance to the measurement gas introduced from the second chamber 40 into the third chamber 61, containing $H_2O$ and CO, and substantially not containing $CO_2$ and oxygen.

The third chamber 61 is formed as a space to oxidize all of CO contained in the measurement gas introduced through the fourth diffusion control part 60 to generate $CO_2$ again. Generation of $CO_2$ due to oxidation of CO is implemented by operation of a third pump cell 41.

The third pump cell 41 is an electrochemical pump cell including a third inner pump electrode 44, the outer pump electrode 23, and a solid electrolyte present in a portion of the structure 14 sandwiched between these electrodes.

In the third pump cell 41, a voltage Vp3 is applied across the third inner pump electrode 44 and the outer pump electrode 23 from a variable power supply 46 disposed outside the sensor element 201 to generate an oxygen pump current (oxygen ion current) Ip3. Oxygen can thereby be pumped in from the external space to the third chamber 61.

The third inner pump electrode 44 is disposed on substantially the entire portion of the upper surface 4a of the first solid electrolyte layer 4 defining the third chamber 61.

The third inner pump electrode 44 is formed, with platinum as a metal component, as a porous cermet electrode including platinum and zirconia and being rectangular in plan view, for example.

In the sensor element 201, a third inner pump electrode 44, the reference electrode 42, and a solid electrolyte present in a portion of the structure 14 sandwiched between these electrodes constitute a third chamber sensor cell 82. The third chamber sensor cell 82 is an electrochemical sensor cell to grasp oxygen partial pressure in an atmosphere in the third chamber 61.

In the third chamber sensor cell 82, electromotive force (Nernst electromotive force) V3 is generated between the third inner pump electrode 44 and the reference electrode 42. The electromotive force V3 has a value in accordance with a difference between an oxygen concentration (oxygen partial pressure) in the third chamber 61 and the oxygen concentration (oxygen partial pressure) of the reference gas. Since the oxygen concentration (oxygen partial pressure) of the reference gas is basically constant, the electromotive force V3 has a value in accordance with the oxygen concentration (oxygen partial pressure) in the third chamber 61.

The sensor element 201 further includes an electrochemical sensor cell 83 including the outer pump electrode 23, reference electrode 42, and a solid electrolyte present in a portion of the structure 14 sandwiched between these electrodes. Electromotive force Vref generated between the outer pump electrode 23 and the reference electrode 42 of the sensor cell 83 has a value in accordance with oxygen partial pressure of the measurement gas present outside the sensor element 201.

In addition to the foregoing, the sensor element 201 includes a heater 72 sandwiched between the second substrate 2 and the third substrate 3 from above and below. The heater 72 generates heat by being powered from outside through a heater electrode 71 disposed on a lower surface 1b of the first substrate 1. The heater 72 is buried over the entire region of a range from the buffer space 12 to the third chamber 61, and can heat the sensor element 201 to a predetermined temperature and, further, maintain the temperature. The heater 72 generates heat to enhance oxygen ion conductivity of the solid electrolyte forming the sensor element 201.

A heater insulating layer 74 of alumina and the like is formed above and below the heater 72 to electrically insulate the heater 72 from the second substrate 2 and the third substrate 3. The heater 72, the heater electrode, and the heater insulating layer 74 are hereinafter also collectively referred to as a heater part. The heater part also includes a pressure dissipation hole 75. The pressure dissipation hole 75 is a part formed to penetrate the third substrate 3 and communicate with the reference gas introduction space 43, and is formed to mitigate a rise in internal pressure associated with a rise in temperature in the heater insulating layer 74.

The controller 210 is configured by one or more electronic circuits including one or more central processing units (CPUs), a storage device, and the like, for example. Each of the electronic circuits is a software functional part implementing a predetermined functional component by a CPU executing a predetermined program stored in the storage device, for example. The controller 210 may naturally be configured by an integrated circuit, such as a field-programmable gate array (FPGA), on which a plurality of electronic circuits are connected in accordance with their functions and the like.

<Multi-Gas Sensing and Concentration Identification>

A method of sensing a plurality of types of gases (multi-gas sensing) and identifying concentrations of the sensed gases implemented by the gas sensor 200 having a configuration as described above will be described next. Assume hereinafter that the measurement gas is an exhaust gas containing oxygen, $H_2O$, and $CO_2$.

In the sensor element 201 of the gas sensor 200 according to the present embodiment, the measurement gas taken through the gas inlet 10 into the element is introduced through the buffer space 12 into the first chamber 20.

In the first chamber 20, oxygen is pumped out from the introduced measurement gas by operation of the first pump cell 21. A reduction (decomposition) reaction ($2H_2O\rightarrow2H_2+O_2$ and $2CO_2\rightarrow2CO+O_2$) of $H_2O$ and $CO_2$ contained in the measurement gas thus progresses, substantially all of $H_2O$ and $CO_2$ are decomposed into hydrogen ($H_2$), carbon monoxide (CO), and oxygen, and oxygen thus generated is pumped out. Decomposition of substantially all of $H_2O$ and $CO_2$ means that $H_2O$ and $CO_2$ are not introduced into the second chamber 40.

This is performed by the controller 210 setting a target value (control voltage) of the electromotive force V1 in the first chamber sensor cell 80 in a range of 1000 mV to 1500 mV (preferably to 1000 mV) in accordance with desired oxygen partial pressure (oxygen concentration), and performing feedback control on the voltage Vp1 applied from the variable power supply 24 to the first pump cell 21 in accordance with a difference between an actual value and the target value of the electromotive force V1 so that the target value is achieved. In this case, the voltage Vp1 is the sum of an IR overpotential and a reaction overpotential.

For example, a value of the electromotive force V1 significantly deviates from the target value when the measurement gas containing a large amount of oxygen reaches the first chamber 20, and thus the controller 210 controls the pump voltage Vp1 applied from the variable power supply 24 to the first pump cell 21 so that the deviation is reduced.

The target value (control voltage) of the electromotive force V1 is set to a value in the range of 1000 mV to 1500 mV, so that oxygen partial pressure in the first chamber 20 is sufficiently reduced. The oxygen partial pressure is approximately $10^{-20}$ atm when an equation V1=1000 mV holds. The measurement gas in the first chamber 20 does not substantially contain $H_2O$, $CO_2$, and oxygen while containing $H_2$ and CO. The measurement gas is introduced into the second chamber 40.

In the second chamber 40, oxygen is pumped in by operation of the second pump cell 50, and only $H_2$ contained in the introduced measurement gas is oxidized.

Pumping-in of oxygen is performed by the controller 210 setting a target value (control voltage) of the electromotive force V2 in the second chamber sensor cell 81 in a range of 250 mV to 450 mV (preferably to 350 mV) in accordance with desired oxygen partial pressure (oxygen concentration), and performing feedback control on the voltage Vp2 applied from the variable power supply 52 to the second pump cell 50 in accordance with a difference between an actual value and the target value of the electromotive force V2 so that the target value is achieved.

By operation of the second pump cell 50 in this manner, an oxidation (combustion) reaction $2H_2+O_2\rightarrow2H_2O$ is facilitated, and $H_2O$ in an amount correlating with the amount of $H_2O$ introduced through the gas inlet 10 is generated again in the second chamber 40. In the present embodiment, $H_2O$ or $CO_2$ in an amount correlating with the amount of $H_2O$ or $CO_2$ means that the amount of $H_2O$ or $CO_2$ introduced through the gas inlet 10 and the amount of $H_2O$ or $CO_2$ generated again by oxidation of $H_2$ and CO generated by decomposition of $H_2O$ and $CO_2$ are the same, or are within a certain error range allowable in terms of measurement accuracy.

By setting the target value of the electromotive force V2 to a value in the range of 250 mV to 450 mV, oxygen partial pressure in the second chamber 40 is maintained at a value in a range in which almost all of $H_2$ is oxidized but CO is not oxidized. The oxygen partial pressure is approximately $10^{-7}$ atm when an equation V2=350 mV holds, for example.

The oxygen pump current Ip2 (hereinafter also referred to as a water vapor detection current Ip2) flowing through the second pump cell 50 when the electromotive force V2 is maintained at the target value is substantially proportional to a concentration of $H_2O$ generated by combustion of $H_2$ in the second chamber 40 (there is a linear relationship between the water vapor detection current Ip2 and the concentration of $H_2O$ as generated). The amount of $H_2O$ generated by combustion correlates with the amount of $H_2O$ in the measurement gas decomposed once in the first chamber 20 after being introduced through the gas inlet 10. $H_2O$ in the measurement gas is thus sensed by detecting the water vapor detection current Ip2.

Furthermore, there is a linear relationship between the water vapor detection current Ip2 and a water vapor concentration of the measurement gas. By identifying data (water vapor characteristics data) showing the linear relationship in advance using a model gas having a known water vapor concentration, a value of the water vapor concentration corresponding to a value of the water vapor detection current Ip2 acquired by the controller 210 can be identified by checking the value of the water vapor detection current Ip2 against the water vapor characteristics data.

If no $H_2O$ is present in the measurement gas introduced through the gas inlet 10, decomposition of $H_2O$ in the first chamber 20 is naturally not caused, and thus $H_2$ is not introduced into the second chamber 40, so that the water vapor detection current Ip2 is almost zero.

As a result that $H_2$ is oxidized into $H_2O$, the measurement gas contains $H_2O$ and CO but substantially does not contain $CO_2$ and oxygen. The measurement gas is introduced into the third chamber 61. In the third chamber 61, oxygen is pumped in by operation of the third pump cell 41, and CO contained in the introduced measurement gas is oxidized.

Pumping-in of oxygen is performed by the controller 210 setting a target value (control voltage) of the electromotive force V3 in the third chamber sensor cell 82 in a range of 100 mV to 300 mV (preferably 200 mV) in accordance with desired oxygen partial pressure (oxygen concentration), and performing feedback control on the voltage Vp3 applied from the variable power supply 46 to the third pump cell 41 in accordance with a difference between an actual value and the target value of the electromotive force V3 so that the target value is achieved.

By operation of the third pump cell 41 in this manner, an oxidation (combustion) reaction $2CO+O_2\rightarrow2CO_2$ is facilitated, and $CO_2$ in an amount correlating with the amount of $CO_2$ introduced through the gas inlet 10 is generated again in the third chamber 61.

By setting the target value of the electromotive force V3 to a value in the range of 100 mV to 300 mV, oxygen partial pressure in the third chamber 61 is maintained at a value in a range in which almost all of CO is oxidized. The oxygen partial pressure is approximately $10^{-4}$ atm when an equation V3=200 mV holds, for example.

The oxygen pump current Ip3 (hereinafter also referred to as a carbon dioxide detection current Ip3) flowing through the third pump cell 41 when the electromotive force V3 is maintained at the target value is substantially proportional to a concentration of $CO_2$ generated by combustion of CO in the third chamber 61 (there is a linear relationship between the carbon dioxide detection current Ip3 and the concentration of $CO_2$ as generated). The amount of $CO_2$ generated by combustion correlates with the amount of $CO_2$ in the measurement gas decomposed once in the first chamber 20 after being introduced through the gas inlet 10. $CO_2$ in the measurement gas is thus sensed by detecting the carbon dioxide detection current Ip3.

Furthermore, there is a linear relationship between the carbon dioxide detection current Ip3 and a carbon dioxide concentration of the measurement gas. By identifying data (carbon dioxide characteristics data) showing the linear relationship in advance using a model gas having a known carbon dioxide concentration, a value of the carbon dioxide concentration corresponding to a value of the carbon dioxide detection current Ip3 acquired by the controller 210 can be identified by checking the value of the carbon dioxide detection current Ip3 against the carbon dioxide characteristics data.

If no $CO_2$ is present in the measurement gas introduced through the gas inlet 10, decomposition of $CO_2$ in the first chamber 20 is naturally not caused, and thus CO is not introduced into the third chamber 61, so that the carbon dioxide detection current Ip3 is almost zero.

As described above, the gas sensor 200 according to the present embodiment can suitably identify the water vapor concentration and the carbon dioxide concentration.

In addition, the gas sensor 200 can indirectly determine a concentration of oxygen contained in the measurement gas. Generally speaking, a difference value between a concentration of oxygen pumped out from the first chamber 20 and concentrations of oxygen pumped in to the second chamber 40 and the third chamber 61 corresponds to the concentration of oxygen contained in the measurement gas introduced through the gas inlet 10. The concentration of oxygen, the concentration of $H_2O$, and the concentration of $CO_2$ contained in the measurement gas have values substantially proportional to the oxygen pump current Ip1, the oxygen pump current Ip2, and the oxygen pump current Ip3, respectively. Thus, when the concentration of oxygen, the concentration of $H_2O$, and the concentration of $CO_2$ contained in the measurement gas are respectively represented by $C_{e\_O2}$, $C_{e\_H2O}$, and $C_{e\_CO2}$, these values can be expressed as shown below. The oxygen pump currents Ip1, Ip2, and Ip3 have positive signs when oxygen is pumped out, and $a_1$ to $a_5$ are constants of proportionality determined experimentally.

$$C_{e\_O2}=a_1 \cdot Ip1+a_2 \cdot Ip2+a_3 \cdot Ip3 \qquad (1)$$

$$C_{e\_H2O}=a_4 \cdot Ip2 \qquad (2)$$

$$C_{e\_CO2}=a_5 \cdot Ip3 \qquad (3)$$

By identifying the equation (1) in advance, the concentration of oxygen contained in the measurement gas can be determined from detected values of the oxygen pump currents Ip1, Ip2, and Ip3. The equation (2) and the equation (3) are nothing less than an equation showing the water vapor characteristics data and an equation showing the carbon dioxide characteristics data, respectively.

<CO_2 Mass Estimation System>

The $CO_2$ mass estimation system 1000 according to the present embodiment will be described next. FIG. 2 schematically shows a configuration of the $CO_2$ mass estimation system 1000. The $CO_2$ mass estimation system 1000 is generally a system for estimating the mass of $CO_2$ contained in the exhaust gas of the engine of the vehicle using the detection currents in the gas sensor 200.

As shown in FIG. 2, the $CO_2$ mass estimation system 1000 includes, in addition to the gas sensor 200, an electronic control unit (ECU) 100 controlling operation of each part of the vehicle, a fuel injection device 301 injecting fuel into (a combustion chamber of) the engine 300 of the vehicle, and an intake part 400 disposed along an air supply path P1 of the engine 300 and supplying air to the engine 300. The gas sensor 200 is attached to an exhaust path P2 of the engine 300. That is to say, the $CO_2$ mass estimation system 1000 according to the present embodiment is configured to include components of the vehicle, and is used by being incorporated into the vehicle.

The gas sensor 200 has the above-mentioned configuration, and is originally used to measure the concentrations of $H_2O$ and $CO_2$ contained in the exhaust gas flowing along the exhaust path P2 and grasp an operating state of the engine 300. In the present embodiment, the gas sensor 200 is used for estimation of the mass of $CO_2$ in the $CO_2$ mass estimation system 1000.

The ECU 100 is configured by an electronic circuit including at least one IC (integrated circuit). The electronic circuit includes at least one processor (not shown). Each of functions of the ECU 100 can be implemented by the processor executing software. The software is described as a program, and is stored in memory (not shown). The memory to store the program may be included in the ECU 100, and is nonvolatile or volatile semiconductor memory, for example.

The ECU 100 mainly includes an integrated control part 110, a fuel injection control part 120, an intake control part 130, a sensor detected value acquisition part 140, and a $CO_2$ mass calculation part 150 as functional components.

The integrated control part 110 provides control instructions to each of the control parts of the ECU 100 in accordance with a state of operation to the vehicle performed by a driver, thereby to perform control of operation of the vehicle as a whole.

The fuel injection control part 120 controls injection of the fuel from the fuel injection device 301 under the control instructions from the integrated control part 110. The fuel injection control part 120 also provides a signal showing an actual value of the amount of injection of the fuel to the integrated control part 110.

The intake control part 130 controls intake from the intake part 400 under the control instructions from the integrated control part 110.

The fuel injection control part 120 and the intake control part 130 respectively control the fuel injection device 301 and the intake part 400 so that injection of the fuel and intake are performed in accordance with an air-fuel ratio A/F set by the integrated control part 110 in accordance with a driving situation of the vehicle.

The sensor detected value acquisition part 140 acquires signals showing various detected values detected by the gas sensor 200. Values of the oxygen pump current Ip1, the oxygen pump current (water vapor detection current) Ip2, and the oxygen pump current (carbon dioxide detection current) Ip3 are taken as examples of the detected values, for example.

The $CO_2$ mass calculation part 150 calculates an estimated value of the mass of $CO_2$ contained in the exhaust gas based on the detected values detected by the gas sensor 200 acquired by the sensor detected value acquisition part 140 and values of the air-fuel ratio A/F and the amount of injection of the fuel issued from the integrated control part 110. The equations (1) to (3) (more specifically constants of proportionality $a_1$ to $a_5$ providing these equations) experimentally identified in advance are stored in the $CO_2$ mass calculation part 150 (more particularly in unshown memory forming the part).

<Procedure for $CO_2$ Mass Estimation>

The procedure for processing of estimating the mass of $CO_2$ contained in the exhaust gas performed in the $CO_2$ mass estimation system 1000 according to the present embodiment will be described next. FIG. 3 schematically shows a relationship among various parameters used for estimation of the mass of $CO_2$ performed by the $CO_2$ mass calculation part 150 of the $CO_2$ mass estimation system 1000.

Generally speaking, in the present embodiment, the composition of the fuel (at least the mass of C atoms contained in a unit mass of the fuel) is estimated based on the detected values of the oxygen pump currents Ip1, Ip2, and Ip3 detected by the gas sensor 200 and the air-fuel ratio set by the integrated control part 110 of the ECU 100, and the mass of $CO_2$ contained in the exhaust gas is estimated based on the estimated composition of the fuel and the actual value of the amount of injection of the fuel from the fuel injection device 301. Estimation of the mass of $CO_2$ in the present embodiment, however, is based on the assumption that the fuel is completely combusted in the engine 300, and the exhaust gas does not contain uncombusted CO and HC.

First, there is a relationship expressed by the above-mentioned equations (1) to (3) between the detected values of the oxygen pump currents Ip1, Ip2, and Ip3 detected by the gas sensor 200 and the concentration $C_{e\_O2}$ of oxygen, the concentration $C_{e\_H2O}$ of $H_2O$, and the concentration $C_{e\_CO2}$ of $CO_2$ contained in the exhaust gas as the measurement gas in a situation in which the exhaust gas generated by combustion in the engine 300 flows along the exhaust path P2.

There is a proportional relationship shown below between the mass of each of C atoms, H atoms, and O atoms contained in a certain mass of the exhaust gas and the concentration of each of oxygen, $H_2O$, and $CO_2$ contained in the exhaust gas expressed by the equations (1) to (3).

mass of atoms $\propto\Sigma$(concentration of target gas×number of atoms in a single molecule of target gas)×atomic weight That is to say, there is a relationship shown below between the mass $m_{e\_C}$ of C atoms, the mass $m_{e\_H}$ of H atoms, and the mass $m_{e\_O}$ of O atoms contained in a certain mass of the exhaust gas and the concentration $C_{e\_O2}$ of oxygen, the concentration $C_{e\_H2O}$ of $H_2O$, and the concentration $C_{e\_CO2}$ of $CO_2$ contained in the exhaust gas expressed by the equations (1) to (3).

$$m_{e\_C}=k_1 \cdot C_{e\_CO2}\times1\times12=k_1\cdot12\cdot C_{e\_CO2} \tag{4}$$

$$m_{e\_H}=k_1\cdot C_{e\_H2O}\times2\times1=k_1\cdot2\cdot C_{e\_H2O} \tag{5}$$

$$m_{e\_O}=k_1\cdot(C_{e\_O2}\times2+C_{e\_H2O}\times1+C_{e\_CO2}\times2)\times16=k_1\cdot(32\cdot C_{e\_O2}+16\cdot C_{e\_H2O}+32\cdot C_{e\_CO2}) \tag{6}$$

where $k_1$ is an appropriate coefficient of proportionality.

In a situation in which the exhaust gas is not generated by combustion in the engine 300, air taken in by the intake part 400 flows along the exhaust path P2 as it is. Thus, by substituting the detected values of the oxygen pump currents Ip1, Ip2, and Ip3 detected by the gas sensor 200 in the situation into equations (1') and (2') shown below, the concentration $C_{a\_O2}$ of oxygen and the concentration $C_{a\_H2O}$ of $H_2O$ contained in the air can be identified.

$$C_{a\_O2}=a_1\cdot Ip1+a_2\cdot Ip2+a_3\cdot Ip3 \tag{1'}$$

$$C_{a\_H2O}=a_4\cdot Ip2 \tag{2'}$$

While the concentration of $CO_2$ can be determined, $CO_2$ has a low concentration of approximately 300 ppm in the air, so that the concentration of $CO_2$ is ignored to be zero in subsequent calculation. $C_{a\_O2}$ and $C_{a\_H2O}$ may be identified by performing measurement at a location different from a location along the exhaust path P2 using a gas sensor separate from the gas sensor 200.

The mass $m_{e\_C}$ of C atoms, the mass $m_{e\_H}$ of H atoms, and the mass $m_{e\_O}$ of O atoms contained in a unit mass of the air are expressed as shown below using the concentration $C_{a\_O2}$ of oxygen and the concentration $C_{a\_H2O}$ of $H_2O$ contained in the air. Assume that the average molecular weight $M_{air}$ of the air is 28.8.

$$m_{a\_C}=0 \tag{7}$$

$$m_{a\_H}=(C_{a\_H2O}\times2\times1)/M_{air}=2\cdot C_{a\_H2O}/M_{air} \tag{8}$$

$$m_{a\_O}=(C_{a\_O2}\times2+C_{a\_H2O}\times1)\times16/M_{air}=(32\cdot C_{a\_O2}+16\cdot C_{a\_H2O})/M_{air} \tag{9}$$

On the other hand, in light of the fuel being composed almost exclusively of C atoms, H atoms, and O atoms, there is a relationship shown below among the mass $m_{f\_C}$ of C atoms, the mass $m_{f\_H}$ of H atoms, and the mass $m_{f\_O}$ of O atoms contained in a unit mass of the fuel.

$$m_{f\_C}+m_{f\_H}+m_{f\_O}=1 \tag{10}$$

The mass of C atoms, the mass of H atoms, and the mass of O atoms contained in a mixture of the fuel and the air are each the sum of the mass of the atoms contained in the fuel and the mass of the atoms contained in the air, and a ratio of the mass of the air to the mass of the fuel in the mixture is the air-fuel ratio A/F. Assuming that a value of the air-fuel ratio A/F is r (=mass of air/mass of fuel), the mass $m_{m\_C}$ of C atoms, the mass $m_{m\_H}$ of H atoms, and the mass $m_{m\_O}$ of O atoms contained in a mixture of a unit mass of the fuel and the air at the air-fuel ratio A/F are expressed as shown below.

$$m_{m\_C}=m_{f\_C}+m_{a\_C}\cdot r \tag{11}$$

$$m_{m\_H}=m_{f\_H}+m_{a\_H}\cdot r \tag{12}$$

$$m_{m\_O}=m_{f\_O}+m_{a\_O}\cdot r \tag{13}$$

During complete combustion (during normal operation of the engine), there is a relationship shown below as the composition of the mixture and the composition of the exhaust gas are equal to each other.

$$m_{m\_C}=m_{e\_C} \tag{14}$$

$$m_{m\_H}=m_{e\_H} \tag{15}$$

$$m_{m\_O}=m_{e\_O} \tag{16}$$

When the equations (4) to (16) are combined, the coefficient of proportionality $k_1$ in each of the equations (4) to (6) is expressed as shown in an equation (17) below.

$$k_1=\{M_{air}+(32\cdot C_{a\_O2}+18\cdot C_{a\_H2O})\cdot r\}/\{M_{air}\cdot(32\cdot C_{e\_O2}+18\cdot C_{e\_H2O}+44\cdot C_{e\_CO2})\} \tag{17}$$

In the equation (17), the average molecular weight $M_{air}$ of the air is a known fixed value. $C_{a\_O2}$ and $C_{a\_H2O}$ are respectively the concentration of oxygen and the concentration of $H_2O$ contained in the air measured by the gas sensor 200. $C_{e\_O2}$, $C_{e\_H2O}$, and $C_{e\_CO2}$ are respectively the concentration of oxygen, the concentration of $H_2O$, and the concentration of $CO_2$ contained in the exhaust gas similarly measured by the gas sensor 200. The air-fuel ratio r is a value set by the integrated control part 110 in accordance with the driving situation of the vehicle. The coefficient of proportionality $k_1$ can thus specifically be determined from the equation (17).

By using the coefficient of proportionality $k_1$, an equation (18) shown below showing the mass $m_{f\_C}$ of C atoms contained in a unit mass of the fuel can be determined from the equations (4), (11), and (14).

$$m_{f\_C}=m_{m\_C}=m_{e\_C}=k_1 \cdot 12 \cdot C_{e\_CO2} \qquad (18)$$

Equations showing the mass $m_{f\_H}$ of H atoms and the mass $m_{f\_O}$ of O atoms contained in a unit mass of the fuel can similarly be determined. In this case, a ratio $m_{f\_C}:m_{f\_H}:m_{f\_O}$ determined from the equation (18) and these two equations is a composition ratio of C atoms, H atoms, and O atoms contained in the fuel.

Furthermore, in light of the equation (10), a value of $m_{f\_C}$ corresponds to the composition of C atoms in the fuel having the composition ratio $m_{f\_C}:m_{f\_H}:m_{f\_O}$, so that it can be said that the equation (18) is an equation to calculate the composition of C atoms in the fuel.

During complete combustion, all of C atoms contained in the fuel change into $CO_2$, so that the mass $m_{e\_CO2}$ of $CO_2$ contained in the exhaust gas generated by injection of a mass $M_f$ of the fuel can be determined from an equation (19) shown below using values of $M_f$ and $m_{f\_C}$.

$$M_{e\_CO2}=M_f \cdot m_{f\_C} \cdot (\text{molecular weight of } CO_2/\text{atomic weight of C})=M_f \cdot m_{f\_C} \cdot (44/12) \qquad (19)$$

Alternatively, the mass $M_{e\_CO2}$ of $CO_2$ may be determined from an equation (20) shown below determined by substituting the equation (18) into the equation (19).

$$M_{e\_CO2}=44 \cdot M_f \cdot k_1 \cdot C_{e\_CO2} \qquad (20)$$

In the present embodiment, when the $CO_2$ mass estimation system 1000 estimates the mass of $CO_2$ at a predetermined timing, the detected values of the oxygen pump currents Ip1, Ip2, and Ip3 at the time when the measurement gas is the exhaust gas and the detected values of the oxygen pump currents Ip1, Ip2, and Ip3 at the time when the measurement gas is the air are first provided from the sensor detected value acquisition part 140 to the $CO_2$ mass calculation part 150, which are acquired by the sensor detected value acquisition part 140 from the gas sensor 200 continuously or intermittently at predetermined timings.

The $CO_2$ mass calculation part 150 calculates $C_{e\_O2}$, $C_{e\_H2O}$, $C_{e\_CO2}$, $C_{a\_O2}$, and $C_{a\_H2O}$ using these values. Assume that the constants of proportionality on a right-hand side of each of the equations (1) to (3) and the equations (1') and (2') are unique to the gas sensor 200 to be used, and are experimentally identified in advance.

The composition of the air is less variable than the composition of the exhaust gas, and measurement with the air as the measurement gas sometimes cannot be performed at the matched timing to estimation depending on the driving situation of the vehicle, so that values of $C_{a\_O2}$ and $C_{a\_H2O}$ calculated previously and then stored in the ECU 100 or identified separately may be used.

The $CO_2$ mass calculation part 150 also acquires the value r of the air-fuel ratio A/F from the integrated control part 110. The coefficient of proportionality $k_1$ is then calculated based on the equation (17).

The $CO_2$ mass calculation part 150 further acquires a value of the mass $M_f$ of the fuel injected from the fuel injection device 301 provided from the fuel injection control part 120 to the integrated control part 110. After the mass $m_{f\_C}$ of C atoms is calculated from the equation (18), the mass $M_{e\_CO2}$ of $CO_2$ is calculated from the equation (19). Alternatively, the mass $M_{e\_CO2}$ of $CO_2$ is calculated based on the equation (20).

In the $CO_2$ mass estimation system 1000 according to the present embodiment, the composition ratio of C atoms, H atoms, and O atoms contained in the exhaust gas when a certain mass of the fuel is injected can be estimated through the above-mentioned procedure. Furthermore, the mass of emission of $CO_2$ can be estimated. According to the procedure, the mass of emission of $CO_2$ can be estimated based on values grasped or set by the ECU 100 during driving of the vehicle, that is, the detected values detected by the gas sensor 200, the air-fuel ratio, and the amount of injection of the fuel without measuring mass flow of the exhaust gas.

EXAMPLE

The $CO_2$ mass estimation system 1000 measured the mass of $CO_2$ contained in the exhaust gas for a gasoline passenger car.

First, the constants of proportionality $a_1$ to $a_5$ [unit: %/mA] in the equations (1) to (3) showing the relationship between the oxygen pump currents Ip1, Ip2, and Ip3 [unit: mA] detected by the gas sensor 200 and the concentration $C_{e\_O2}$ of oxygen, the concentration $C_{e\_H2O}$ of $H_2O$, and the concentration $C_{e\_CO2}$ of $CO_2$ [unit: %] contained in the exhaust gas were experimentally identified in advance using a model gas as shown below:

$$C_{e\_O2}=20.0 \cdot Ip1+22.0 \cdot Ip2+57.1 \cdot Ip3;$$

$$C_{e\_H2O}=-10.0 \cdot Ip2; \text{ and}$$

$$C_{e\_CO2}=-71.4 \cdot Ip3.$$

The gas sensor 200 was attached to a tailpipe of the gasoline passenger car, and measured the exhaust gas when the passenger car was driven under the following conditions:
speed of the passenger car: constant at 60 km/h;
measurement time: 60 seconds;
amount of injection of fuel per unit time: 0.34 g/s; and
air-fuel ratio r: 14.3.

Values of the resultant oxygen pump currents Ip1, Ip2, and Ip3 were as follows:
Ip1=1.63 mA;
Ip2=−1.04 mA; and
Ip3=−0.17 mA.

The concentration $C_{a\_O2}$ of oxygen and the concentration $C_{a\_H2O}$ of $H_2O$ contained in the air identified in advance were as follows:
concentration $C_{a\_O2}$ of oxygen in air: 20.7%; and
concentration $C_{a\_H2O}$ of $H_2O$ in air: 1.0%.

A value of the constant of proportionality $k_1$ was determined from the equation (17) using these values as shown below.
$k_1$=0.60669.

On the other hand, the concentration $C_{e\_CO2}$ of $CO_2$ contained in the exhaust gas was calculated as shown below.

$$C_{e\_CO2}=-71.4 \cdot Ip3=-71.4 \times (-0.17)=12.1\%.$$

When these values were substituted into the equation (18), the mass $m_{f\_C}$ of C atoms contained in a unit mass of the fuel was as shown below.

$$m_{f\_C}=k1 \cdot 12 \cdot C_{e\_CO2}=0.60669 \times 12 \times 12.1=88\%.$$

The composition ratio of the fuel was as shown below.

$$m_{f\_C}:m_{f\_H}:m_{f\_O}=88:12:0$$

The estimated value $M_{e\_CO2}$ of the mass of $CO_2$ contained in the exhaust gas (when the fuel was injected at 0.34 g/s for 60 seconds) was eventually calculated as shown below.

$$M_{e\_CO2}=M_f \cdot m_{f\_C} \cdot (44/12)=(0.34 \times 60) \cdot (88/100) \cdot (44/12)=66 \text{ g}$$

A value of the mass of emission of $CO_2$ measured simultaneously by a constant volume dilution sampling device for comparison was 64 g, which was approximately equal to the estimated value $M_{e\_CO2}$. An error between them was approximately 3%.

The result indicates that the mass of emission of $CO_2$ can be estimated without measuring mass flow.

While the invention has been shown and described in detail, the foregoing description is in all aspects illustrative and not restrictive. It is therefore understood that numerous modifications and variations can be devised without departing from the scope of the invention.

What is claimed is:

1. A system for estimating a mass of emission of $CO_2$ contained in an exhaust gas from an engine of a vehicle, the system comprising:

an electronic control unit including an integrated control part, a fuel injection control part, an intake control part, a sensor detected value acquisition part, and a $CO_2$ mass calculation part;

a gas sensor capable of outputting detected values in accordance with concentrations of oxygen, $H_2O$, and $CO_2$ contained in a measurement gas;

the sensor detected value acquisition part acquiring the detected values in accordance with the concentrations of oxygen, $H_2O$, and $CO_2$ contained in the exhaust gas from the engine, the detected values being output from the gas sensor; and the fuel injection control part and the intake control part respectively controlling injection of fuel and air intake in accordance with an air-fuel ratio set by an air-fuel ratio setting element that sets the air-fuel ratio of a mixture of the fuel and the air supplied to the engine;

wherein the $CO_2$ mass calculation part calculates the mass of emission of $CO_2$ contained in the exhaust gas, and wherein the $CO_2$ mass calculation part calculates the concentrations of oxygen, $H_2O$, and $CO_2$ contained in the exhaust gas based on the detected values output from the gas sensor when the measurement gas is the exhaust gas, acquires concentrations of oxygen and $H_2O$ in air, acquires the air-fuel ratio set by the air-fuel ratio setting element, calculates a composition ratio of at least C atoms contained in the fuel based on the concentrations of oxygen, $H_2O$, and $CO_2$ contained in the exhaust gas, the concentrations of oxygen and $H_2O$ in the air, and the air-fuel ratio acquired from the air-fuel ratio setting element, and estimates the mass of emission of $CO_2$ contained in the exhaust gas based on the calculated composition ratio and an amount of the injection of the fuel into the engine.

2. A method of estimating a mass of $CO_2$ contained in an exhaust gas from an engine of a vehicle, the method comprising:

a) acquiring detected values in accordance with concentrations of oxygen, $H_2O$, and $CO_2$ contained in the exhaust gas from the engine from a gas sensor capable of outputting the detected values in accordance with the concentrations of oxygen, $H_2O$, and $CO_2$ contained in a measurement gas;

b) calculating the concentrations of oxygen, $H_2O$, and $CO_2$ contained in the exhaust gas based on the detected values;

c) acquiring concentrations of oxygen and $H_2O$ in air;

d) acquiring an air-fuel ratio of a mixture of fuel and air supplied to the engine;

e) estimating a composition ratio of C atoms, H atoms, and O atoms contained in the fuel based on the concentrations of oxygen, $H_2O$, and $CO_2$,$CO_2$ contained in the exhaust gas calculated in the step b), the concentrations of oxygen and $H_2O$ in the air acquired in the step c), and the air-fuel ratio acquired in the step d); and f) estimating the mass of $CO_2$ contained in the exhaust gas based on the composition ratio of C atoms contained in the fuel estimated in the step e) and an amount of injection of the fuel into the engine.

* * * * *